US006625875B2

(12) United States Patent
Sol

(10) Patent No.: US 6,625,875 B2
(45) Date of Patent: Sep. 30, 2003

(54) METHOD OF ATTACHING BUS BARS TO A CONDUCTIVE COATING FOR A HEATABLE VEHICLE WINDOW

(75) Inventor: Jean-Marc Sol, Thionville (FR)

(73) Assignee: Centre Luxembourgeois de Recherches pour le Verre et la Ceramique S.A. (C.R.V.C.), Grand Duchy (LU)

( * ) Notice: Subject to any disclaimer, the term of this patent is extended or adjusted under 35 U.S.C. 154(b) by 333 days.

(21) Appl. No.: 09/816,757

(22) Filed: Mar. 26, 2001

(65) Prior Publication Data

US 2003/0019859 A1 Jan. 30, 2003

(51) Int. Cl.$^7$ .............................................. H01C 17/28
(52) U.S. Cl. .......................... 29/621; 29/611; 29/612; 29/613; 29/831; 29/846; 427/163.1; 219/203
(58) Field of Search .......................... 29/611, 612, 613, 29/831, 846; 427/163.1, 374.1, 374.2, 374.3; 219/203, 543, 542

(56) References Cited

U.S. PATENT DOCUMENTS

| 3,721,595 A | * | 3/1973 | Tarnopol et al. ......... 156/89.17 |
| 4,543,466 A | * | 9/1985 | Ramus ....................... 219/203 |
| 4,644,139 A | | 2/1987 | Harrison et al. |
| 4,668,270 A | | 5/1987 | Ramus |
| 4,743,741 A | * | 5/1988 | Ramus ....................... 219/543 |
| 4,782,216 A | | 11/1988 | Woodard |
| 4,786,783 A | | 11/1988 | Woodard |
| 4,820,902 A | | 4/1989 | Gillery |
| 4,830,876 A | | 5/1989 | Dietrich et al. |
| 4,940,884 A | | 7/1990 | Gillery |
| 4,943,484 A | | 7/1990 | Goodman |
| 5,028,759 A | | 7/1991 | Finley |
| 5,066,111 A | | 11/1991 | Singleton et al. |
| 5,229,205 A | * | 7/1993 | Nietering ..................... 428/336 |
| 5,332,888 A | | 7/1994 | Tausch et al. |
| 5,434,384 A | | 7/1995 | Koontz |
| 5,514,476 A | | 5/1996 | Hartig et al. |
| 5,523,877 A | * | 6/1996 | Lynam ........................ 359/275 |
| 5,557,462 A | | 9/1996 | Hartig et al. |
| 5,877,473 A | | 3/1999 | Koontz |
| 6,010,220 A | | 1/2000 | Smarto |
| 6,444,293 B1 | | 9/2002 | Gregory et al. |

FOREIGN PATENT DOCUMENTS

WO     WO 88/06095     8/1988

* cited by examiner

Primary Examiner—Carl J. Arbes
Assistant Examiner—Tai Nguyen
(74) Attorney, Agent, or Firm—Nixon & Vanderhye P.C.

(57) ABSTRACT

A heatable vehicle window (e.g., windshield, sidelite or backlite) includes a multi-layer coating formed on a substrate. The multi-layer coating includes at least one dielectric layer and at least one conductive layer. A pair of bus bars are deposited on the substrate over the coating, so that at least the dielectric layer is provided between the bus bars and the conductive layer(s). In order to create an electrical connection between the bus bars and the conductive layer(s) of the coating, the bus bars and/or coating is/are heated to a temperature sufficient to permit the bus bars to reach molten or semi-molten form. Portions of bus bar material then flow down through at least the dielectric layer of the coating (i.e., forming a contact hole in the coating) so as to contact the coating's conductive layer(s). After cooling of the newly formed bus bars, the window may be selectively heated by passing current through the conductive layer(s) via the bus bars.

12 Claims, 7 Drawing Sheets

METHOD OF ATTACHING BUS BARS TO A CONDUCTIVE COATING FOR A HEATABLE VEHICLE WINDOW

This invention relates to a method of attaching bus bar(s) to a coating (e.g., low emissivity coating) in the context of a vehicle window (e.g., vehicle windshield), or other heatable window (e.g. IG architectural window unit). In particular, certain embodiments of this invention relate to a method of heating at least a conductive bus bar(s) in a manner such that a portion of the bus bar(s) bleeds down through at least one dielectric layer of the coating and ultimately contacts at least one electroconductive layer(s) of the coating.

BACKGROUND OF THE INVENTION

Heatable windows are known in the art. For example, see U.S. Pat. Nos. 4,668,270; 5,434,384; 4,782,216; and 4,820,902, the disclosures of which are all hereby incorporated herein by reference. See also WO 88/06095. Heatable windows conventionally include first and second conductive bus bars in electrical contact with a transparent conductive coating including an electroconductive layer. The electroconductive layer generates heat when electric current is passed therethrough. In such a manner, the window may be defogged and/or snow/ice may be melted from vehicle windows such as windshields, backlites, sidelites, and/or the like.

Typically, in the context of such articles, the electroconductive layer is deposited directly onto and over the conductive bus bars in order to establish an electrical connection between the bus bars and the electroconductive layer. However, this is problematic when the coating includes a dielectric layer(s) desired to be positioned between the bus bar(s) and an electroconductive layer of the coating. In such instances, the presence of the dielectric layer between the bus bars and the electroconductive layer could prevent a good electrical connection which is desired between the bus bars and the electroconductive layer.

In an effort to solve this problem, U.S. Pat. No. 5,332,888 illustrates a film stack (i.e., coating) deposited over top of bus bars. However, the bus bars are designed to have a roughened or jagged upper surface. As a result, jagged points at the tops of the respective bus bar(s) project through lower dielectric layer(s) of the coating and make electrical contact with the conductive silver (Ag) layers of the coating. Unfortunately, this is problematic because (i) it is not always desirable to have jagged shaped bus bar(s), and/or (ii) this requires the bus bar(s) to be placed on the substrate prior to the deposition of the coating stack which is not always desirable for a variety of processing reasons.

In view of the above, it will be apparent to those skilled in the art that there exists a need in the art for a more efficient way of establishing an electrical connection between bus bars and an electroconductive layer(s) of a coating. There also exists a need for enabling a multi-layer coating to be deposited on a substrate, and thereafter establishing an electrical connection between a conductive layer(s) of the coating and a pair of bus bars.

SUMMARY OF THE INVENTION

An object of this invention is to provide an efficient method and/or system of establishing an electrical connection between a pair of bus bars and a conductive layer of a multi-layer coating. The multi-layer coating may be a low-E (i.e., low emissivity) coating in certain embodiments of this invention, although all embodiments are not so limited.

Another object of certain example embodiments of this invention is to provide a method for electrically connecting at least one bus bar(s) to an electroconductive layer of a multi-layer coating, wherein the multi-layer coating has been deposited on a substrate prior to deposition of the bus bar(s) on the substrate.

Another object of example embodiments of this invention is to provide a heatable vehicle window (e.g., windshield, sidelite or backlite) including a multi-layer coating formed on a substrate. The multi-layer coating includes at least one dielectric layer and at least one conductive layer. A pair of bus bars are deposited on the substrate over the coating, so that at least the dielectric layer is provided between the bus bars and the conductive layer(s). In order to create an electrical connection between the bus bars and the conductive layer(s) of the coating, the bus bars and/or coating is/are heated to a temperature sufficient to permit the bus bars to reach molten or semi-molten flowable form. Portions of bus bar material then flow down through at least the dielectric layer of the coating (i.e., forming a contact hole in at least part of the coating) so as to contact the coating's conductive layer(s). After cooling of the newly formed bus bars, the window may be selectively heated by passing current through the conductive layer(s) via the bus bars.

Another object of this invention is to fulfill one or more of the above-listed objects.

Generally speaking, an example embodiment of this invention fulfills one or more of the above-listed objects by providing a method of making a heatable vehicle window, the method comprising:

depositing a multi-layer coating on a substrate, the multi-layer coating including at least one dielectric layer and at least one conductive layer;

forming first and second conductive bus bars on the substrate over the coating such that the bus bars as formed are not in electrical contact with the at least one conductive layer of the coating; and heating at least the first and second bus bars to a temperature sufficient to cause the bus bars to flow or migrate through the at least one dielectric layer creating a contact hole therein and make contact with the at least one conductive layer, so that after cooling the first and second bus bars are in electrical contact with the at least one conductive layer of the coating.

Another example embodiment of this invention fulfills one or more of the above-listed objects by providing a method of making a heatable window, the method comprising:

depositing a multi-layer coating on a glass substrate, the multi-layer coating including at least one dielectric layer and at least one conductive layer;

forming at least one conductive bus bar over the coating such that the dielectric layer is located between the bus bar and the at least one conductive layer; and heating the bus bar to a temperature sufficient to cause the bus bar to bleed through the dielectric layer and contact the at least one conductive layer, so that after cooling the bus bar is in electrical contact with the at least one conductive layer of the coating.

Another embodiment of this invention fulfills one or more of the above-listed objects by providing a heatable window (e.g., vehicle window, architectural IG window, or the like), comprising:

a glass substrate;

a multi-layer coating provided on said glass substrate, said coating comprising a first conductive metal layer located between first and second dielectric layers;

first and second conductive bus bars formed over said coating so that the coating is located between the glass substrate and the bus bars; and wherein a run-off or bleeded portion of each of said first and second bus bars extends through a respective contact hole in at least said first dielectric layer so that each of said first and second bus bars is in electrical contact with said first conductive metal layer of said coating.

This invention will now be described with respect to certain example embodiments thereof as illustrated in the following drawings, wherein:

IN THE DRAWINGS

DETAILED DESCRIPTION OF CERTAIN EXEMPLARY EMBODIMENTS OF THE INVENTION

Figure 1:
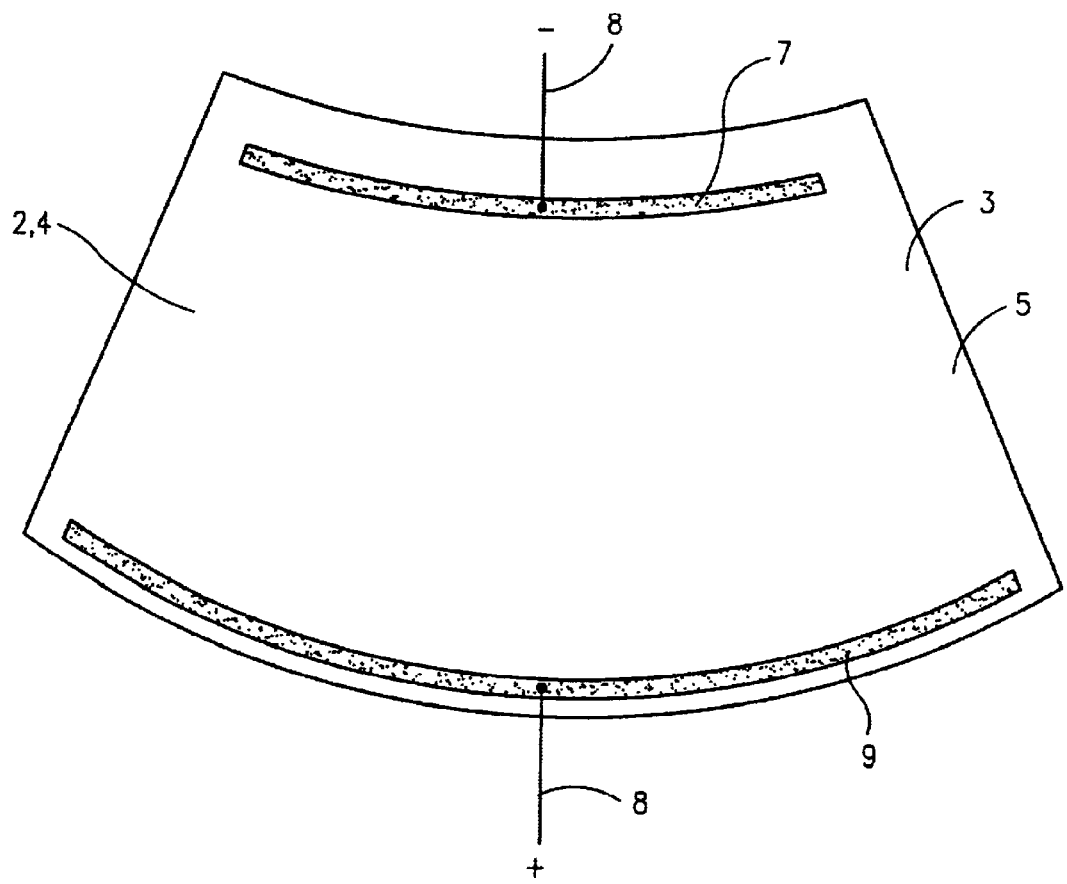
FIG. 1 is a top plan view of a vehicle windshield according to an exemplary embodiment of this invention (absent opaque shielding layers for purposes of illustration simplicity).

Referring now more particularly to the accompanying drawings in which like reference numerals indicate like parts or layers throughout the several views.

Certain embodiments of this invention relate to a method and/or system of electrically connecting a pair of bus bars to an electroconductive layer (e.g., Ag layer) of a coating such as a low-E coating in the context of a vehicle window, architectural window, and/or the like. Certain embodiments of this invention provide a multi-layer low-E coating or layer system on a substrate. Such multi-layer coatings may have low-E characteristics, high visible transmittance, and/or or be heat treatable in example embodiments. Preferably, coatings of certain embodiments herein are mechanically durable before and/or after heat treatment (HT), and HT does not cause a significant jump in sheet resistance ($R_s$) and/or haze. As is known in the art, HT often necessitates heating the coated substrate to temperatures of from 1100° F. (593° C.) to 1450° F. (788° C.) for a sufficient period of time to attain the desired result (e.g., tempering, bending, and/or heat strengthening).

After deposition of the multi-layer coating on a substrate, first and second electroconductive bus bars are deposited on the substrate over the multi-layer coating. However, at the time when the bus bars are deposited, at least one dielectric layer(s) of the multi-layer coating is located between the bus bars and an electroconductive layer(s) of the coating so that the bus bars are not electrically connected to the electroconductive layer(s) when/as deposited. In order to provide an electrical connection between the bus bars and the coating's electroconductive layer(s), the bus bars and/or the coating is/are heated to a temperature sufficient to cause at least a portion of the bus bars to flow or bleed downward through at least the dielectric layer(s) of the coating and make contact with the electroconductive layer(s) of the coating. Thus, after this heating and resulting bleeding of the bus bars into/through the multi-layer coating, the bus bars are electrically connected to the electroconductive layer(s) of the coating. Accordingly, when electric current is passed through the electroconductive layer(s) of the coating via the bus bars, the electroconductive layer(s) generates heat and enables ice/snow to be melted from the vehicle window, and/or enables the vehicle window to be defogged and/or defrosted.

Figure 2:
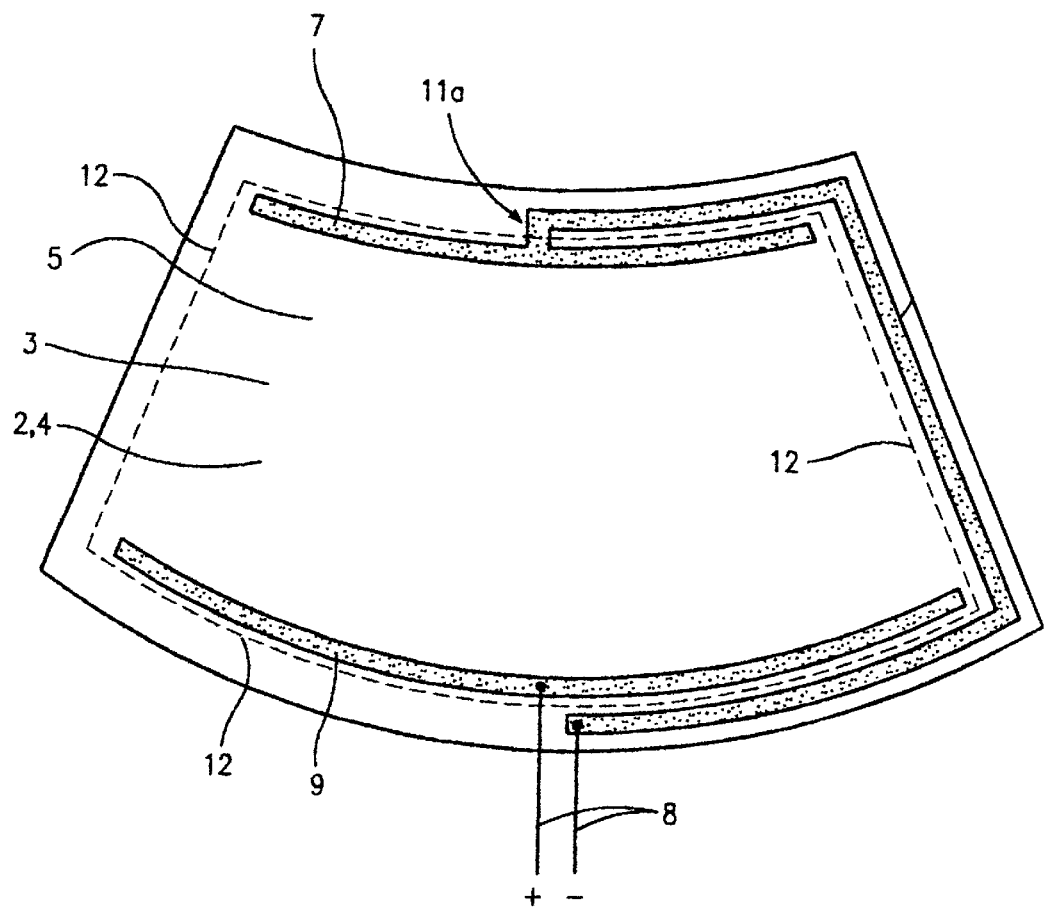
FIG. 2 is a top plan view of a another vehicle windshield according to another exemplary embodiment of this invention (absent opaque shielding layers for purposes of illustration simplicity).
Figure 6:
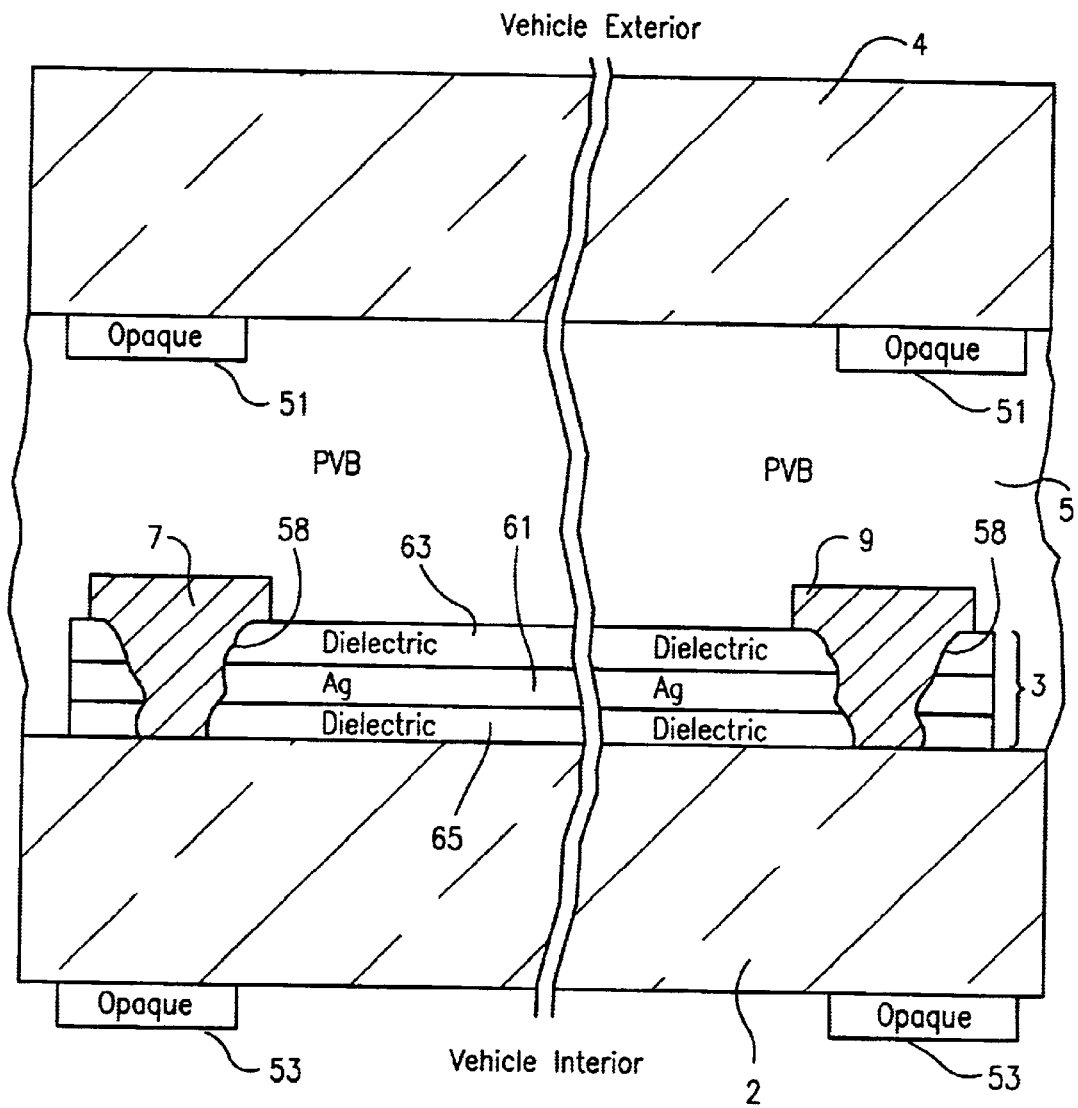
FIG. 6 is a side cross sectional view of a vehicle window (e.g., vehicle windshield) according to another embodiment of this invention, this embodiment being similar to the FIGS. 1–5 embodiment(s) except that the multi-layer coating includes only one electroconductive layer (e.g., Ag layer) sandwiched between a pair of dielectric layers.
Figure 7:
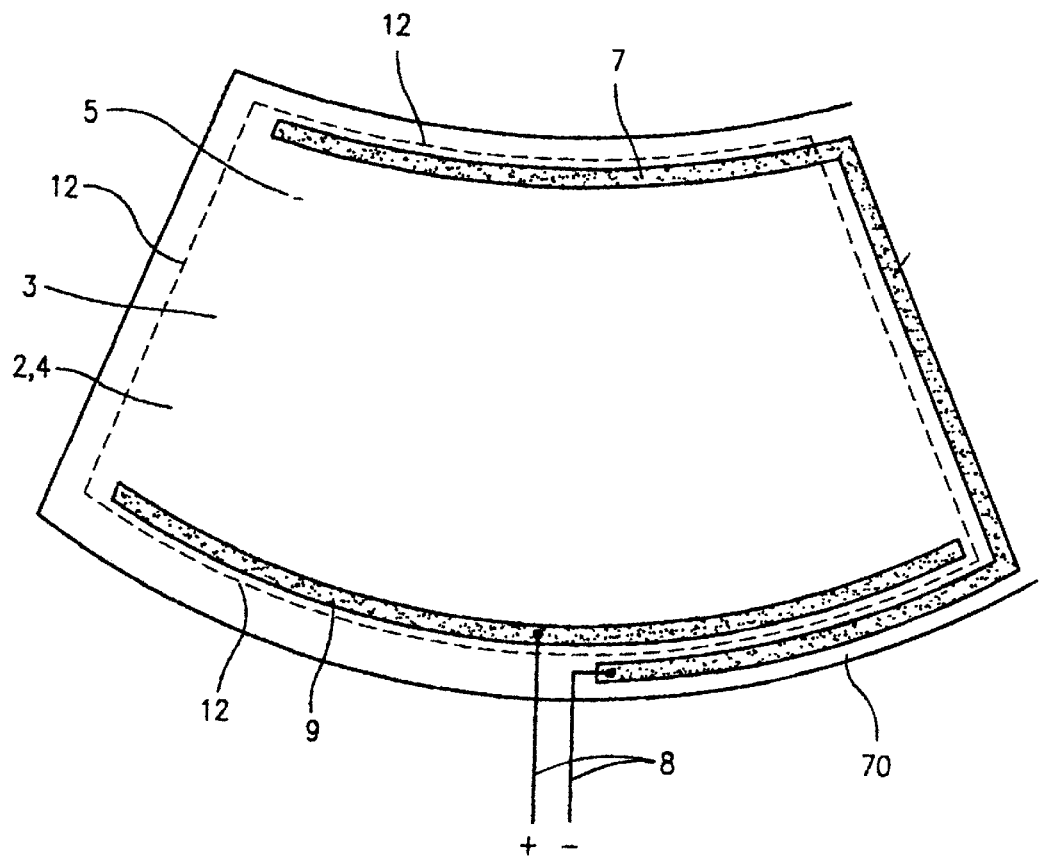
FIG. 7 is a top plan view of a another vehicle windshield according to another exemplary embodiment of this invention (absent opaque shielding layers for purposes of illustration simplicity).

FIGS. 1, 2 and 7 are top plan views of example vehicle windshields according to first and second embodiments of this invention. Opaque shielding layers (discussed below) are not illustrated in FIGS. 1–2 for purposes of illustration simplicity. Referring to FIGS. 1, 2, and 5–7, each of the windshields includes a multi-layer low-E coating 3 sandwiched between first and second glass substrates 2 and 4, respectively. Moreover, a polyvinyl butyral (PVB) layer 5 is also provided between the substrates for conventional lamination purposes. According to many embodiments of this invention, the multi-layer coating 3 is provided on the interior surface of one of substrates 2, 4, so that the coating is provided on what is known conventionally as the windshield's #2 or #3 surface. First and second electroconductive bus bars 7 and 9, respectively, are provided between the substrates 2, 4, so as to be in electrical contact with at least one electroconductive layer of the multi-layer coating 3. When current is passed through the electroconductive layer(s) of the coating 3 via bus bars 7 and 9 (using electrical connectors/leads 8), heat is generated in order to defog, defrost, and/or melt ice/snow from the vehicle window.

In the FIG. 1 embodiment, first bus bar 7 is provided at a top area of the windshield and bottom bus bar 9 is provided at a bottom area of the windshield proximate a wiper rest area. Electrical connectors 8 are provided on both sides of the window, in electrical communication with bus bars 7 and 9, respectively. Thus, the viewing zone of the windshield, located between the bus bars 7 and 9, is heated when current is passed through the electroconductive layer(s) of coating 3 via bus bars 7 and 9.

In the FIG. 2 embodiment, first bus bar 7 is provided at a top area of the windshield and bottom bus bar 9 is provided at a bottom area of the windshield proximate a wiper rest area. However, conductive extension 11 (preferably deposited at the same time as, and using the same material as, bus bar 7) extends from a central portion of top bus bar 7 and ultimately down to a bottom portion of the windshield so that both electrical connectors 8 can be located on one side of the windshield in approximately the same area. Portions of coating 3 proximate the edge(s) of the substrate 2 are deleted (i.e., referred to as edge deletion) so that extension 11 is electrically insulated from coating 3 and bus bars 7, 9 at locations other than connection area 11a. Edge deletion line 12 illustrates the outer edge of coating 3 in this embodiment.

In the FIG. 7 embodiment, a single conductive extension 70 extends from an end of the top bus bar 7 down along or proximate an edge of the windshield to the bottom edge, and then along the bottom edge to the connector area. Extension 70 is preferably electrically insulated from coating 3 due to edge deletion 12 of the coating. In certain example embodiments, extension 70 may be approximately uniform in width throughout its length, while in other embodiments its width may be tapered as shown in FIG. 7 (i.e., the smaller width end of the extension be at the connection to bus bar 7, and the larger width portion of the extension being distant from bar 7).

Figure 3:
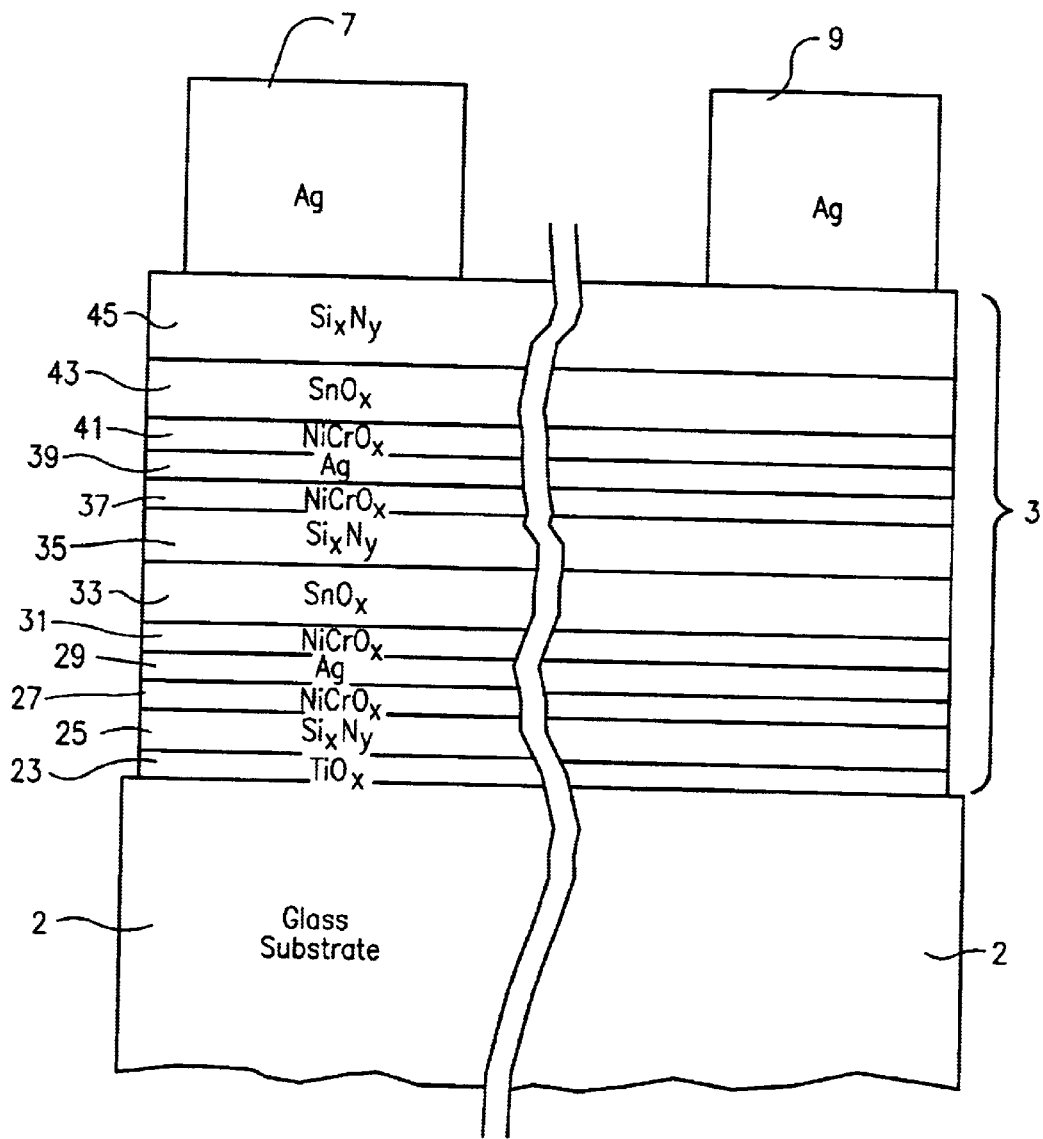
FIG. 3 is a side cross sectional view of a multi-layer coating provided on one of the substrates of the vehicle windshield of FIG. 1 and/or FIG. 2, with a pair of silver (Ag) frit inclusive bus bars deposited on the substrate over the coating, during the process of manufacturing the windshield of FIG. 1 and/or FIG. 2.
Figure 4:
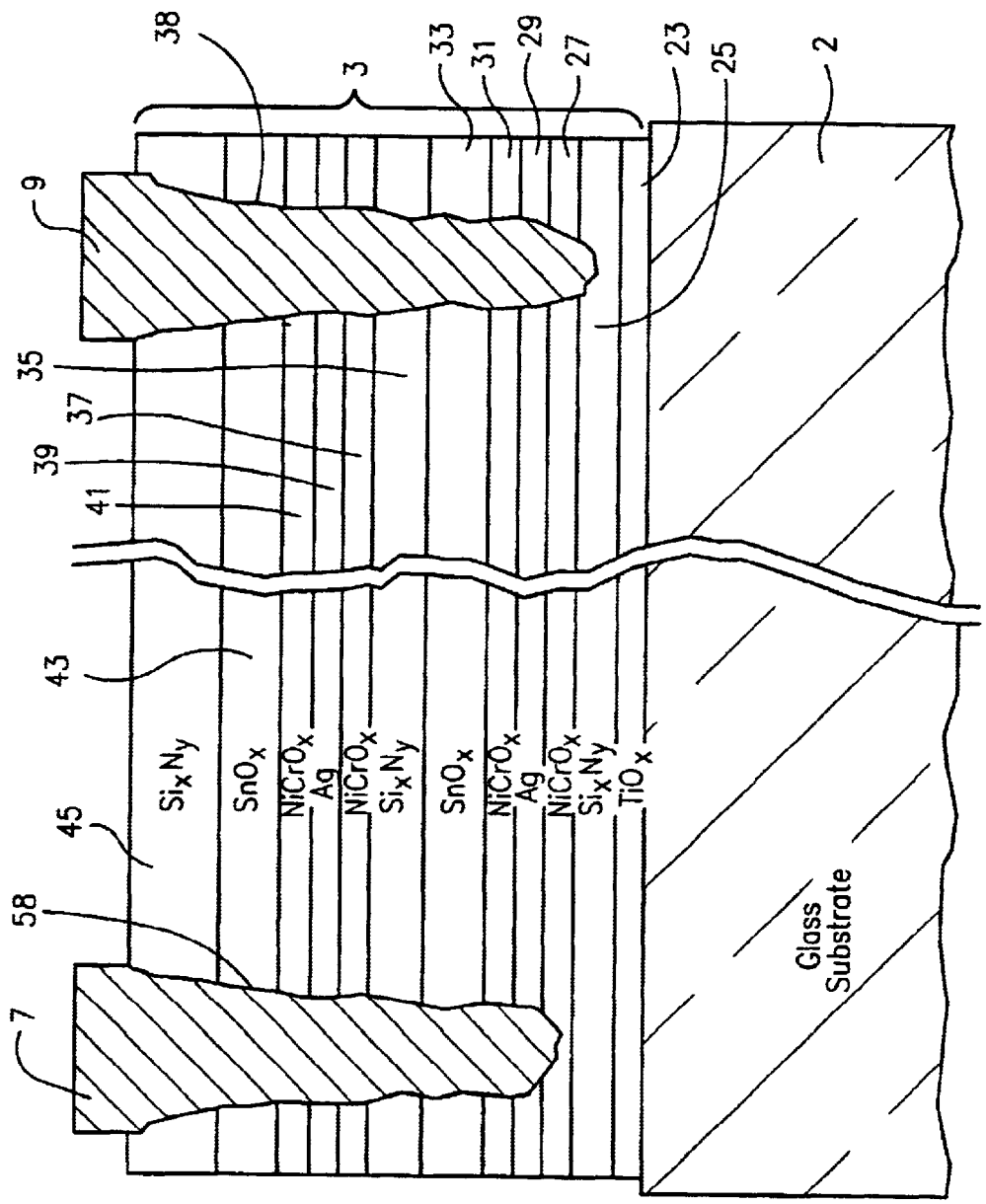
FIG. 4 is a side cross sectional view of the bus bars and coating of FIG. 3, after and/or during heating which causes at least a portion of the bus bars to bleed through at least one dielectric layer of the coating and come into contact with at least one of the electroconductive silver (Ag) layers of the coating thereby establishing an electrical connection with the same.
Figure 5:
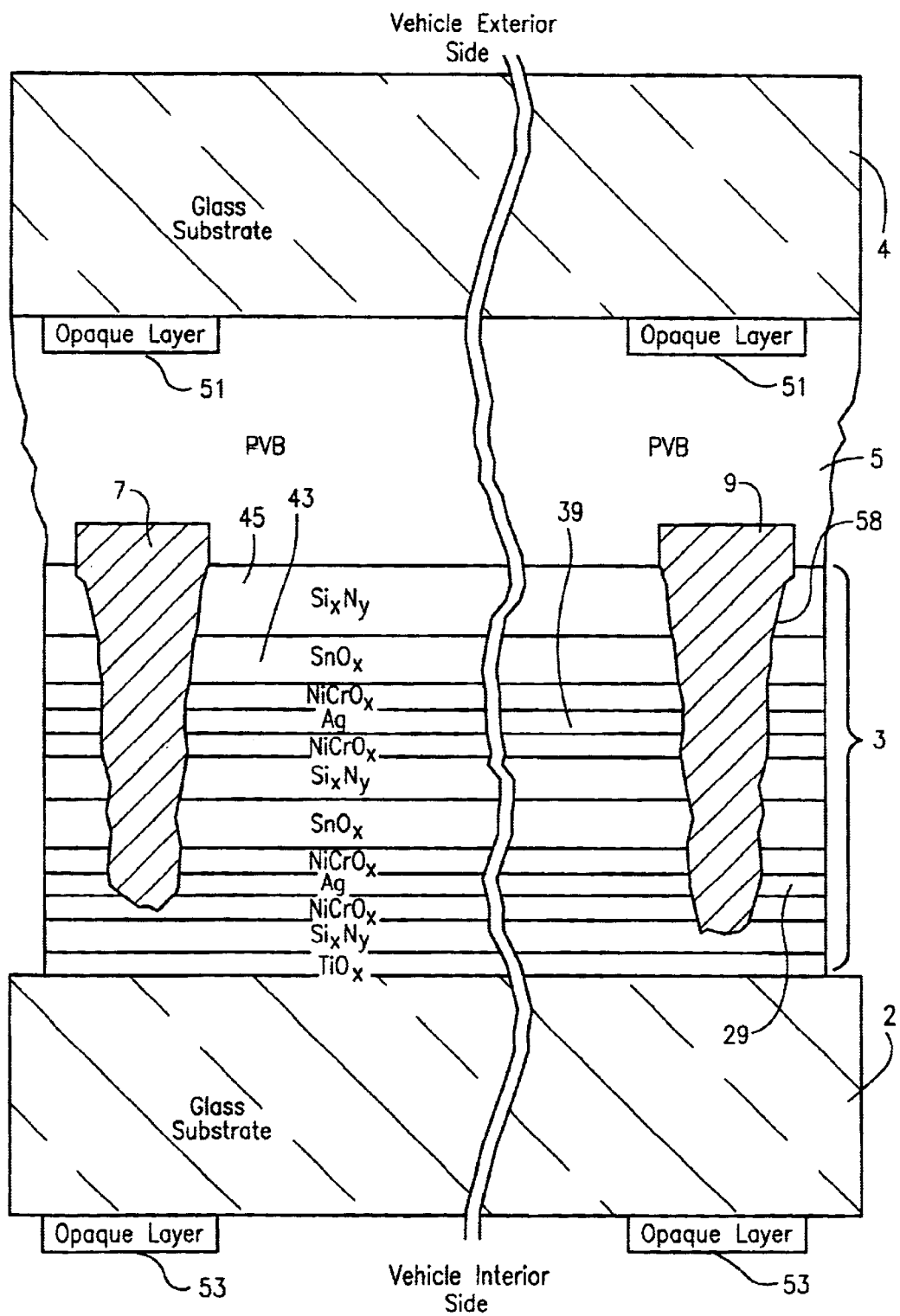
FIG. 5 is a side cross sectional view of the vehicle window of FIG. 1 and/or FIG. 2; i.e., after the FIG. 4 structure has been laminated to another glass or plastic substrate with a polymer (e.g., PVB) layer provided therebetween to complete a vehicle windshield or other vehicle window.

Referring to FIGS. 3–5, an exemplary method of making the heatable windshield(s) of FIGS. 1, 2 and/or 7 will now be described. The materials illustrated for the various layers in FIGS. 3–5 are for purposes of example only. Initially, float glass (e.g., soda-lime-silica glass) substrate 2 is provided. Substrate 2 is from about 1.0 to 10.0 mm thick, more preferably from about 1.6 mm to 4 mm thick. Low-E coating 3 is deposited on substrate 2. Multi-layer coating 3 includes first dielectric anti-reflection layer 23, second dielectric haze-reducing layer 25, first lower contact layer 27 (which contacts layer 29), first electroconductive metallic infrared (IR) reflecting layer 29, first upper contact layer 31 (which contacts layer 29), third dielectric layer 33 (which may be deposited in one or multiple steps in different embodiments of this invention), fourth dielectric layer 35, second lower contact layer 37 (which contacts layer 39), second electroconductive metallic IR reflecting layer 39, second upper contact layer 41 (which contacts layer 39), fifth dielectric layer 43, and finally sixth protective dielectric layer 45. The "contact" layers each contact at least one IR reflecting layer. The aforesaid layers 23–45 make up heat treatable low-E (i.e., low emissivity) coating 3 which is provided on substrate 2.

In certain embodiments of this invention, first dielectric layer 23 may be of or include titanium dioxide ($TiO_x$ where x is from 1.7 to 2.3, most preferably 2.0), silicon nitride ($Si_xN_y$ where x/y may be about 0.75 (i.e., $Si_3N_4$), or alternatively x/y may be from about 0.76 to 1.5 in Si-rich embodiments), silicon dioxide ($SiO_x$ where x is from 1.7 to 2.3, most preferably about 2.0), niobium oxide (e.g., $Nb_2O_5$), SiZrN, tin oxide, zinc oxide, silicon oxynitride, or any other suitable dielectric material. First dielectric layer 23 functions as an antireflection layer in certain embodiments of this invention.

Second dielectric layer 25 may function to reduce haze in certain embodiments of this invention, and is preferably of or includes silicon nitride (e.g., $Si_3N_4$, or alternatively silicon-rich silicon nitride $Si_xN_y$ where x/y is from 0.76 to 1.5, more preferably from 0.85 to 1.2). When sputtering silicon nitride layer(s) herein, a Si target may be used, or alternatively a target including Si admixed with up to 3–20% by weight aluminum and/or stainless steel (e.g. SS#316) may be used, with about this amount of aluminum and/or steel then appearing in the layer(s) so formed. Other materials may also be used for haze reducing layer 25, including but not limited to SiZrN.

While $Si_3N_4$ may be used for layer 25 (and/or layer 35) in certain embodiments, it has been found that a silicon rich type of silicon nitride as layer 25 is better at reducing haze and/or improving mechanical durability in certain embodiments of this invention. Absent this layer 25 (and/or 35), haze tends to be at least 0.45; whereas with this layer(s) it is reduced to no greater than 0.4 as discussed herein. In Si-rich silicon nitride embodiments, layer 25 (and/or layer 35) is of or includes $Si_xN_y$ where x/y is from 0.76 to 1.5, more preferably from about 0.85 to 1.2. $Si_3N_4$ has an index of refraction "n" of about 2.04, and an extinction coefficient "k" of about 0. Si-rich silicon nitride according to certain embodiments of this invention may have an index of refraction of at least about 2.05, more preferably of at least about 2.07, and may be 2.08 (at 550 and/or 632 nm) in exemplary embodiments. Also, Si-rich silicon nitride according to certain embodiments of this invention may have an extinction coefficient "k" of at least about 0.001, and more preferably of at least about 0.003. In a first monolithic example after HT of a Si-rich nitride layer 5 (and/or 15), "n" was 2.099 and "k" was 0.0034; while in a second monolithic example after HT "n" was 2.168 and "k" was 0.014. Si-rich silicon nitride, in addition to being better at reducing haze than $Si_3N_4$, has also been found to adhere better to the titanium oxide of layer 23 in example embodiments. Surprisingly, it has also been found that Si-rich silicon nitride under the $NiCrO_x$ and Ag layers provides a lower sheet resistance ($R_S$).

Electroconductive (or simply conductive) infrared (IR) reflecting layers 29 and 39 are preferably metallic and conductive, and may be made of or include silver (Ag), gold, or any other suitable IR reflecting material. However, metallic Ag is the material of choice for the IR reflecting layers 29 and 39 in certain example embodiments of this invention. These IR reflecting layers help enable coating 3 to have low-E characteristics, as well as heatability.

Contact layers 27, 31, 37, and 41 are of or include nickel (Ni) oxide, or a nickel alloy oxide such as nickel chrome oxide ($NiCrO_x$), in preferred embodiments of this invention. $NiCrO_x$ layers 27, 31, 37, and/or 41 may be fully oxidized in certain embodiments of this invention (i.e., fully stochiometric), or may be at least about 75% oxidized in other embodiments of this invention. While $NiCrO_x$ is a preferred material for layers 27, 31, 37 and/or 41, those skilled in the art will recognize that other materials may instead be used (e.g., oxides of Ni, oxides of Ni alloys, oxides of Cr, oxides of Cr alloys, $NiCrO_xN_y$, or any other suitable material) for one or more of these layers. It is noted that contact layers 27, 31, 37 and/or 41 may or may not be continuous in different embodiments of this invention.

When layers 27, 31, 37 and/or 41 comprise $NiCrO_x$ in certain embodiments, the Ni and Cr may be provided in different amounts, such as in the form of nichrome by weight about 80–90% Ni and 10–20% Cr. An exemplary sputtering target for depositing these layers includes not only SS-316 which consists essentially of 10% Ni and 90% other ingredients, mainly Fe and Cr, but Haynes 214 alloy as well, which by weight consists essentially of (as a nominal composition) the following materials which may also show up in these layers:

| Element | Weight % |
|---------|----------|
| Ni | 75.45 |
| Fe | 4.00 |
| Cr | 16.00 |
| C | .04 |
| Al | 4.50 |
| Y | .01 |

One or more of contact layers 27, 31, 37, and/or 41 (e.g., of or including $NiCrO_x$) is/are preferably oxidation graded in certain embodiments of this invention so that the degree of oxidation in the layer(s) changes throughout the thickness of the layer(s). For example, one or more of contact layers (27, 31, 37 and/or 41) may be graded so as to be less oxidized at the contact interface with the immediately adjacent IR reflecting layer (29 or 39) than at a portion of the contact layer(s) further or more/most distant from the immediately adjacent IR reflecting layer. It is believed that oxidation grading of one or more of contact layer(s) enables the low-E coating 3 to achieve the combination of heat treatability and high visible transmission (which was not previously achievable using $NiCrO_x$ contact layers in a dual silver low-E coating system.

Still referring to FIG. 3, third dielectric layer 33 acts as a coupling layer between the two halves of the coating 3, and is of or includes tin oxide in certain embodiments of this invention. However, other dielectric materials may instead be used for layer 33, including but not limited to silicon nitride, titanium dioxide, niobium oxide, silicon oxynitride, zinc oxide, or the like. Fourth dielectric layer 35 functions as a haze reducer in certain embodiments of this invention, and is preferably of or includes silicon nitride (e.g., $Si_3N_4$, or alternatively silicon-rich silicon nitride discussed above). However, in alternative embodiments of this invention, other materials (e.g., SiZrN) may instead be used for dielectric layer 35.

Fifth dielectric layer 43 may be of or include tin oxide in certain embodiments of this invention. However, other dielectric materials may instead be used for layer 43, including but not limited to silicon nitride, titanium dioxide, niobium oxide, silicon oxynitride, zinc oxide, or the like. Protective overcoat dielectric layer 45 is provided at least for durability purposes, and may be of or include silicon nitride (e.g., $Si_3N_4$) in certain embodiments of this invention. However, other dielectric materials may instead be used for layer 45, including but not limited to titanium dioxide, silicon oxynitride, tin oxide, zinc oxide, niobium oxide, SiZrN, or the like.

Other layer(s) below or above the illustrated coating 3 may also be provided. Thus, while the layer system or coating 3 is "on" or "supported by" substrate 2 (directly or indirectly), other layer(s) may be provided therebetween. Thus, for example, coating 3 of FIG. 3 may be considered "on" and "supported by" the substrate 2 even if other layer(s) are provided between layer 23 and substrate 2. Moreover, certain layers of coating 3 may be removed in certain embodiments, while others may be added in other embodiments of this invention without departing from the overall spirit of certain embodiments of this invention.

While various thicknesses may be used for the layers of multi-layer coating 3, exemplary thicknesses and example materials for the respective layers on the glass substrate 2 are as follows:

TABLE 1

(Example Materials/Thicknesses for Coating 3)

| Layer | Preferred Range (Å) | More Preferred (Å) | Example (Å) |
|-------|--------------------|--------------------|-------------|
| $TiO_2$ (layer 23) | 0–400 Å | 50–250 Å | 100 Å |
| $Si_xN_y$ (layer 25) | 0–400 Å | 50–250 Å | 170 Å |
| $NiCrO_2$ (layer 27) | 5–100 Å | 10–50 Å | 18 Å |
| Ag (layer 29) | 50–250 Å | 80–120 Å | 105 Å |
| $NiCrO_x$ (layer 31) | 5–100 Å | 10–50 Å | 16 Å |
| $SnO_2$ (layer 33) | 0–800 Å | 500–850 Å | 650 Å |
| $Si_xN_y$ (layer 35) | 0–800 Å | 50–250 Å | 170 Å |
| $NiCrO_x$ (layer 37) | 5–100 Å | 10–50 Å | 18 Å |
| Ag (layer 39) | 50–250 Å | 80–120 Å | 105 Å |
| $NiCrO_x$ (layer 41) | 5–100 Å | 10–50 Å | 16 Å |
| $SnO_2$ (layer 43) | 0–500 Å | 100–300 Å | 150 Å |
| $Si_3N_4$ (layer 45) | 0–500 Å | 100–300 Å | 250 Å |

In other example embodiments, dielectric layer 23 may be removed, and/or layers 23 and 25 may be replaced with a single silicon nitride layer of either $Si_3N_4$ or of the Si-rich type of silicon nitride described above.

In certain exemplary embodiments of this invention, coating/layer systems 3 according to example embodiments have the following low-E characteristics before/after heat treatment (HT) when in monolithic form, as set forth in Table 2:

TABLE 2

Monolithic Before/After Heat Treatment (HT)

| Characteristic | General | More Preferred | Most Preferred |
|----------------|---------|----------------|----------------|
| $R_s$ (ohms/sq.) (before HT): | <=10.0 | <=8.0 | <=5.0 |
| $R_s$ (ohms/sq.) (after HT): | <=8.0 | <=6.0 | <=4.0 |
| $E_n$ (before HT): | <=0.08 | <=0.06 | n/a |
| $E_n$ (after HT): | <=0.07 | <=0.05 | n/a |
| Haze (after HT): | <=0.40 | <=0.30 | <=0.28 |

An example low-E coating 3 was deposited as follows on substrate 2 using a Leybold Terra-G six-chamber sputter coating apparatus. Five cathodes were in each chamber, so there were a total of 30 cathode targets in the sputter coater. Cathode numbering utilizes the first digit to refer to the coater chamber, and the second digit to refer to the cathode position in that chamber. For example, cathode #32 was the second cathode (second digit) in the third (first digit) sputter chamber. Cathode #s C13, C14, C23, C62, C31, C32, C62, C64 and C65 were Twin Mag II type cathodes; cathode #C42 was a dual C-Mag type cathode; and cathode #s C44, C51, and C53 were planar cathodes. In the sputter coater, layers 27–31 and 37–41 were sputtered onto the substrate using DC power sputtering, while the other layers were sputtered onto the substrate using a mid-frequency AC type system. Below, "*" means Al content of approximately 10%. The line speed was 2.6 meters per minute (m/min.). All gas flows (e.g., oxygen, argon, nitrogen) are presented in units of mL/minute. In the below examples, though not shown in the charts, the oxygen flow was turned off at the sides of the NiCr targets discussed above in order to oxidation grade the contact layers 31 and 41 so that they were more oxidized further from the Ag layer(s). Volts refers to cathode volts, and amps (A) refers to cathode amps. "Tr" stands for trim; and trim (Tr) console, trim (Tr) Mid, and trim (Tr) pump are all measured in mL/minute. Pressure is measured in mbar× $10^{-3}$. Trim gas refers to individually adjusted gas flows along the cathode length to make corrections regarding layer thickness uniformity. The NiCr targets were approximately 80/20 NiCr. The process is broken into three separate charts (i.e., Part #s 1–3) because so much information is presented; only the cathode and target data is provided for all three charts for ease of reference. Both silicon nitride layers 25 and 35 were Si-rich through their entire thickness(es); as can be seen by the fact that much more inert argon (Ar) gas than nitrogen gas was used in sputtering these silicon nitride layers.

TABLE 3

Coater Setup/Processes for Coating 3

| Cathode Flow | Target | Volts (V) | Power (kW) | Ar Flow (mL/min) | $O_2$ Flow (mL/min) | $N_2$ |
|---|---|---|---|---|---|---|
| #13 | Ti  | 743 | 73   | 200 | 25  | 80  |
| #14 | Ti  | 703 | 64   | 200 | 35  | 50  |
| #23 | Ti  | 738 | 63.5 | 200 | 35  | 50  |
| #42 | Si* | 456 | 29.7 | 225 | 0   | 165 |
| #44 | NiCr| 370 | 4.3  | 150 | 38  | 0   |
| #51 | Ag  | 432 | 3.2  | 100 | 0   | 0   |
| #53 | NiCr| 386 | 4.1  | 150 | 48  | 0   |
| #62 | Sn  | 431 | 18.3 | 200 | 240 | 100 |
| #31 | Sn  | 477 | 24.2 | 200 | 290 | 100 |
| #32 | Sn  | 428 | 24.5 | 200 | 300 | 100 |
| #42 | Si* | 453 | 30.2 | 225 | 0   | 165 |
| #44 | NiCr| 360 | 4.2  | 150 | 38  | 0   |
| #51 | Ag  | 430 | 3.2  | 100 | 0   | 0   |
| #53 | NiCr| 380 | 4.1  | 150 | 48  | 0   |
| #62 | Sn  | 442 | 18.4 | 200 | 240 | 100 |
| #64 | Si* | 554 | 40.6 | 200 | 0   | 200 |
| #65 | Si* | 545 | 40.3 | 250 | 0   | 200 |

| Cathode | Target | Amps (A) | Tank Voltage (V) | Freg. (kHz) | Trim Gas |
|---|---|---|---|---|---|
| #13 | Ti  | 128  | 364 | 26.7  | $O_2$ |
| #14 | Ti  | 125  | 346 | 26.7  | $O_2$ |
| #23 | Ti  | 110  | 344 | 26.5  | $O_2$ |
| #42 | Si* | n/a  | 230 | 26.18 | $N_2$ |
| #44 | NiCr| 11.4 | 0   | 0     | Ar |
| #51 | Ag  | 7.4  | 0   | 0     | Ar |
| #53 | NiCr| 10.7 | 0   | 0     | Ar |
| #62 | Sn  | 45   | 203 | 25.03 | $O_2$ |
| #31 | Sn  | 61   | 224 | 25.6  | $O_2$ |
| #32 | Sn  | 60   | 225 | 25.64 | $O_2$ |
| #42 | Si* | n/a  | 230 | 26.18 | $N_2$ |
| #44 | NiCr| 11.6 | 0   | 0     | Ar |
| #51 | Ag  | 7.4  | 0   | 0     | Ar |
| #53 | NiCr| 10.5 | 0   | 0     | Ar |
| #62 | Sn  | 42   | 208 | 25.1  | $O_2$ |
| #64 | Si* | 93.5 | 264 | 26.4  | $N_2$ |
| #65 | Si* | 93.5 | 273 | 26.2  | $N_2$ |

| Cathode active | Target | Tr Console | Tr Mid | Tr Pump | Pressure | Lambda | Lambda |
|---|---|---|---|---|---|---|---|
| #13 | Ti  | 7.5  | 15 | 7.5  | $2.79E^{-03}$ | 252 | True  |
| #14 | Ti  | 12.5 | 25 | 12.5 | $3.03E^{-03}$ | 252 | True  |
| #23 | Ti  | 7.5  | 35 | 7.5  | $4.83E^{-03}$ | 252 | True  |
| #42 | Si* | 50   | 5  | 45   | $2.18E^{-03}$ | 0   | False |
| #44 | NiCr| 15   | 70 | 15   | $2.26E^{-03}$ | 0   | False |
| #51 | Ag  | 15   | 70 | 15   | $1.37E^{-03}$ | 0   | False |
| #53 | NiCr| 15   | 70 | 15   | $2.16E^{-03}$ | 0   | False |
| #62 | Sn  | 15   | 70 | 15   | $2.12E^{-03}$ | 220 | True  |
| #31 | Sn  | 15   | 70 | 15   | $2.97E^{-03}$ | 220 | True  |
| #32 | Sn  | 15   | 70 | 15   | $3.19E^{-03}$ | 220 | True  |
| #42 | Si* | 50   | 5  | 45   | $2.52E^{-03}$ | 0   | False |
| #44 | NiCr| 15   | 70 | 15   | $2.30E^{-03}$ | 0   | False |
| #51 | Ag  | 15   | 70 | 15   | $1.44E^{-03}$ | 0   | False |
| #53 | NiCr| 15   | 70 | 15   | $2.38E^{-03}$ | 0   | False |
| #62 | Sn  | 15   | 70 | 15   | $2.24E^{-03}$ | 220 | True  |
| #64 | Si* | 20   | 60 | 20   | $2.88E^{-03}$ | 0   | False |
| #65 | Si* | 20   | 60 | 20   | $3.61E^{-03}$ | 0   | False |

Further details on coating 3 are available in U.S. patent application Ser. No. 09/794,224, the disclosure of which is hereby incorporated herein by reference.

After the example of coating 3 was sputtered onto substrate 2 in accordance with the above, it was tested/measured as follows in Table 4 (i.e., in a monolithic state). Heat treatment (HT) was performed by placing the coated articles into a furnace heated to about 625 degrees C. for about five (5) minutes, for purposes of simulating heat bending and/or tempering.

TABLE 4

Coating 3 Properties Before/After Heat Treatment (HT) [Monolithic]

| Characteristic | Example of Coating 3 |
|---|---|
| $T_{vis}$, Ill. A, 2° (before HT): | >=70% |
| $T_{vis}$, Ill. A, 2° (after HT): | >=78% |
| $R_s$ (ohms/sq.) (before HT): | 4.43 |
| $R_s$ (ohms/sq.) (after HT): | 3.46 |
| $E_n$ (before HT): | <=0.06 |
| $E_n$ (after HT): | <=0.05 |
| Haze (after HT): | 0.15 |

Referring to FIG. 3, after coating 3 has been sputtered onto substrate 2, bus bars 7 and 9 (e.g., of or including Ag inclusive frit) are silk screen deposited/printed on substrate 2 over coating 3 so as to be in contact with the surface of coating 3. This is shown in FIG. 3. After deposition of the bus bars 7 and 9, dielectric layers 43 and 45 of coating 3 are located between the bus bars 7, 9 and the electroconductive layers 29, 39 of coating 3. Thus, the bus bars are not in electrical contact with conductive layers 29, 39 at this time. In certain embodiments of this invention, bus bars 7 and/or 9 are each from about 2 to 20 μm thick, more preferably from about 5–15 μm thick, and sometimes about 10 μm thick. Accordingly, bus bars 7 and 9 are much thicker than layers of coating 3 as deposited, although the drawings do not necessarily illustrate this for purposes of simplicity. One bus bar 7 is deposited on substrate 2 and coating 3 at an upper portion of the substrate, while the other 9 is deposited on substrate 2 and coating 3 at a lower portion of the substrate as shown in FIGS. 1–2. For the FIG. 2 embodiment, edge deletion of coating 3 is performed prior to bus bar deposition and extension 11 is silk screen deposited along with the bus bars 7, 9.

Referring to FIGS. 3–4, the FIG. 3 structure (with bus bars 7, 9 on substrate 2 over coating 3) is then heated (e.g., to a temperature of at least 400 degrees C., more preferably from about 500 to 700 degrees C.) for a period of time (e.g., at least one minute, more preferably from about 3–15 minutes) so that bus bars 7 and 9 become molten or at least reach a flowable semi-molten state (i.e., the transition and/or flowable temperature of bus bars 7 and 9 is less than that of layers 29 and 39). In certain example embodiments, this heating is also used for heat bending the coated article of FIGS. 3–4 into the desired windshield shape in windshield embodiments (i.e., the bus bars 7, 9 flow into contact with the Ag layers of the coating during the heat bending process). In alternative embodiments, this heating may be different from any heat bending.

During this bus bar bleeding heating step (which may or may not be performed simultaneously with heat bending), it has surprisingly been found that at least portions of molten or semi-molten bus bars 7, 9 bleed/flow and/or migrate downward through at least dielectric layers 43 and 45 of coating 3 until coming into contact with conductive layer(s) 39 and/or 29 of coating 3 as shown in FIG. 4. The portions of bus bars 7 and 9 extending below the surface of coating 3 (i.e., below the outer surface of layer 45) may be referred to as the run-off or bleeded portion(s) of the bus bar(s). The bus bars 7, 9 and/or coating 3 may be heated to an extent such that the bus bars end up contacting only one conductive layer 39, or alternatively to an extent such that the bus bars end up contact both conductive layers 29 and 39 of coating 3 though contact holes 58 formed in coating 3 (the contact holes 58 are formed in at least layers 41, 43 and 45 by the bleeding downward of the bus bar material). The bleeding of the bus bars 7, 9 may or may not reach substrate 2 in different embodiments of this invention, depending upon how long and to what temperature the FIG. 3 structure is heated. In preferred embodiments, after this heating/bleeding step and subsequent cooling and solidifying of the bus bars 7 and 9, the newly formed bus bars 7 and 9 are now both in electrical contact with conductive layers 29 and 39 as shown in FIG. 4 while still retaining their presence at the upper surface of coating 3 so that they can be in electrical contact with connectors 8.

Connectors 8 may be attached to the bus bars at this point in the process (i.e., before lamination to another substrate). However, in alternative embodiments of this invention, the connectors 8 may be soldered onto the bus bars following the autoclave where the coated article of FIG. 4 is laminated to another substrate 4.

Referring to FIGS. 4–5, after formation of the FIG. 4 structure as described above, the FIG. 4 structure is laminated to another substrate (e.g., glass substrate) 4 via PVB layer 5 thereby resulting in the heatable windshield of FIG. 5. Optionally, an opaque enamel layer (e.g., black or dark enamel) 51 may be provided on the interior surface of substrate 4 adjacent only relevant edge(s) thereof as shown in FIG. 5 in order to shield bus bars 7, 9 from the view of persons viewing the heatable window from outside the vehicle. Also, in certain optional embodiments, an opaque enamel layer (e.g., black or dark enamel) 53 may be provided on the #4 surface of the windshield or window (i.e., on the outer surface of inner substrate 2) adjacent only relevant edge(s) thereof as shown in FIG. 5 in order to shield bus bars 7, 9 from the view of persons viewing the heatable window from the vehicle interior. Instead of enamel, layers 51 and/or 53 may instead be of or include opaque dark organic material such as black primer.

Following formation of the FIG. 5 heatable window structure, it may be installed into a vehicle to complete a vehicle window assembly. When electric current is run through both conductive layers 29 and 39 of coating 3 via bus bars 7, 9, heat is generated by the coating (i.e., by at least layers 29, 39). This heat may be used to defog the window, defrost the window, and/or melt snow/ice from the window or wipers therefor.

Referring now to FIG. 6, it is noted that the multi-layer coating 3 of FIGS. 3–5 is provided for purposes of example only, and this invention is not so limited. For example, this invention is also applicable to coatings having only one electroconductive layer, as well as to coatings including three or more conductive layers. For example in this regard, reference is made to FIG. 6.

In the FIG. 6 embodiment, conductive (e.g., of or including Ag) layer 61 is located between dielectric layers 63 and 65. Conductive layer 61 may instead comprise gold, NiCr, indium-tin-oxide (ITO), or any other suitable conductive material in other embodiments of this invention. Each of dielectric layers 63, 65 includes at least one dielectric layer in different embodiments of this invention. For example, dielectric layers 63, 65 may be of or include silicon nitride, silicon oxide, zinc oxide, silicon oxynitride, tin oxide, zinc titanium dioxide, niobium oxide, SiZrN, and/or any other suitable dielectric in different embodiments of this invention.

In the FIG. 6 embodiment, after the conductive bus bars 7, 9 have been deposited (e.g., via silk screen deposition or any other suitable deposition process) on substrate over coating 3 so as to rest upon the outer surface of dielectric layer 63, the bus bars and/or coating is/are heated (e.g., to a temperature of at least 400 degrees C., more preferably from about 500 to 700 degrees C.) for a period of time (e.g., at least one minute, more preferably from about 3–15 minutes) so that bus bars 7 and 9 become molten or at least flowable semi-molten in form (i.e., the transition and/or flowable (similar to melting point) temperature of bus bars 7 and 9 is less than that of layers 29 and 39 in certain example embodiments). As discussed above, this heating causes at least portions of molten or semi-molten bus bars 7, 9 to bleed and/or migrate downward through at least dielectric layer(s) 63 of coating 3 until coming into contact with conductive layer(s) 61 as shown in FIG. 6. The bleeding of the bus bars 7, 9 may or may not reach substrate 2 in different embodiments of this invention. After this heating/bleeding step and subsequent cooling and solidifying of the bus bars 7 and 9, the newly formed bus bars 7 and 9 are now both in electrical contact with conductive layer(s) 61 through respective contact holes 58 formed in the coating 3 (i.e., the contact holes 58 are formed in at least layer 63) as shown in FIG. 6 while still retaining their presence at the upper surface of coating 3 so that they can be in electrical contact with connectors 8 (see discussion of connectors 8 above). Then, the coated substrate is laminated to another substrate 4 via PVB layer 5 as discussed above in the previous embodiment.

In certain example embodiments, vehicle windows of the FIG. 1–6 embodiments of this invention may be characterized as follows in Table 5, though the invention is not so limited unless the same is recited in the claims.

TABLE 5

Color/Transmission After HT; Laminated Form

| Characteristic | General | More Preferred |
| --- | --- | --- |
| $T_{vis}$ (Ill. A, 2 deg.): | >=70% | >=75% |
| $T_{vis}$ (Ill. C, 2 deg.): | >=70% | >=75% |
| $R_gY$ (Ill. A, C; 2 deg.): | <=11% | <=9% |
| $a^*_g$ (Ill. A, C; 2°): | -2.0 to +2.0 | -1.0 to +1.0 |
| $b^*_g$ (Ill. A, C; 2°): | -10.0 to +1.0 | -8.0 to -2.0 |
| $R_fY$ (Ill. A, C; 2 deg.): | <=11% | <=9% |
| $a^*_f$ (Ill. A, C; 2°): | -3.0 to +1.0 | -2.0 to 0.0 |
| $b^*_f$ (Ill. A, C; 2°): | -5.0 to 0.0 | -4.0 to -1.0 |
| $R_{solar}$: | >=26% | >=28% |
| Haze: | <=0.4 | <=0.3 |
| $T_{solar}$: | <=50% | <=48% |

It will be recognized by those skilled in the art that the aforesaid coating is for purposes of example only and that other coatings 3 may instead be used. For example, any of the coatings of any of U.S. Pat. Nos. 5,514,476, 5,557,462, 5,584,902, 5,770,321, 5,425,861, or 5,800,933 may be used as coating 3 as may any other suitable coating including a conductive heatable layer.

Once given the above disclosure many other features, modifications and improvements will become apparent to the skilled artisan. Such other features, modifications and improvements are therefore considered to be a part of this invention, the scope of which is to be determined by the following claims:

What is claimed is:

1. A method of making a heatable vehicle window, the method comprising:

depositing a multi-layer coating on a substrate, the multi-layer coating including at least one dielectric layer and at least one conductive layer;

forming first and second conductive bus bars on the substrate over the coating such that the bus bars as formed are not in electrical contact with the at least one conductive layer of the coating; and heating at least the first and second bus bars to a temperature sufficient to cause at least portions of the respective bus bars to flow or migrate through the at least one dielectric layer creating respective contact holes therein and make contact with the at least one conductive layer, so that after cooling the first and second bus bars are in electrical contact with the at least one conductive layer of the coating.

2. The method of claim 1, wherein the bus bars have a lower transition or flowable point than a transition or flowable point of the at least one conductive layer.

3. The method of claim 1, further comprising:

following said heating and cooling, laminating the substrate with the bus bars and coating thereon to another substrate with a polymer layer therebetween to form a laminate, and installing the laminate in a vehicle windshield frame to form a vehicle windshield assembly.

4. The method of claim 1, wherein said heating comprises heating at least the first and second bus bars to a temperature of from about 500–700 degrees C.

5. The method of claim 1, wherein the coating has a sheet resistance $R_S$ less than or equal to 6 ohms/sq, the substrate is glass, and wherein during said heating the glass substrate is also heat bent into a desired vehicle windshield shape so that the flow or migration of the bus bars takes place during a heat bending step for the substrate.

6. The method of claim 1, wherein the coating includes the at least one conductive layer and another conductive layer, and wherein said heating comprises heating at least the first and second bus bars to a temperature sufficient to cause the bus bars to flow or migrate through multiple dielectric layers and one of the conductive layers creating contact hole(s) therein, and make contact with both the at least one conductive layer and the another conductive layer, so that after cooling the first and second bus bars are in electrical contact with the at least one conductive layer and the another conductive layer of the coating.

7. The method of claim 6, wherein the first and second bus bars comprise a silver frit material, and wherein the conductive layers comprise silver.

8. The method of claim 1, wherein the at least one dielectric layer comprises at least one of an oxide and a nitride.

9. The method of claim 1, wherein said multi-layer coating comprises at least firs and second conductive layers, and after said heating the first and second bus bars are each in electrical contact with each of said first and second conductive layers.

10. The method of claim 1, wherein said multi-layer coating comprises first and second layers comprising silver with at least one dielectric layer therebetween, and after said heating the first and second bus bars are each in electrical contact with each of the first and second layers comprising silver.

11. The method of claim 1, wherein said heating causes at least portions of the first and second bus bars to migrate through at least two different dielectric layers in order to make contact with the at least one conductive layer.

12. The method of claim 1, wherein said multi-layer coating comprises at least first and second dielectric layers located over an upper conductive layer, and at least a third dielectric layer located between the upper conductive layer and a lower conductive layer, and wherein said heating causes at least portions of the first and second bus bars to flow or migrate through at least the first, second and third dielectric layers so that after said heating the fist and second bus bars are in electrical contact with each of the upper and lower conductive layers.

* * * * *